(12) United States Patent
Kim et al.

(10) Patent No.: US 10,444,511 B2
(45) Date of Patent: Oct. 15, 2019

(54) HEAD-MOUNTED DISPLAY APPARATUSES

(71) Applicant: LUMENS CO., LTD., Yongin-si, Gyeonggi-do (KR)

(72) Inventors: Daewon Kim, Yongin-si (KR);
Seongbok Yoon, Yongin-si (KR);
Hanbeet Chang, Yongin-si (KR);
Myungji Moon, Yongin-si (KR);
Yongpil Kim, Yongin-si (KR); JaeSoon Park, Yongin-si (KR)

(73) Assignee: LUMENS CO., LTD., Yongin-si (KR)

( * ) Notice: Subject to any disclaimer, the term of this patent is extended or adjusted under 35 U.S.C. 154(b) by 31 days.

(21) Appl. No.: 15/716,513

(22) Filed: Sep. 26, 2017

(65) Prior Publication Data
US 2018/0136467 A1    May 17, 2018

(30) Foreign Application Priority Data

Nov. 16, 2016 (KR) .................. 10-2016-0152542
Jan. 3, 2017 (KR) .................. 10-2017-0000553

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0016* (2013.01); *G02B 6/0035* (2013.01);
(Continued)

(58) Field of Classification Search
CPC .... H04N 13/04; H04N 13/332; H04N 13/344;
H04N 2213/001; G06F 3/011–3/013;
G06T 19/006; G02C 7/10;
G02B 27/0101; G02B 27/0025; G02B 27/017; G02B 27/0172; G02B 27/0176;
G02B 26/105; G02B 6/0016; G02B 6/0033; G02B 6/0035; G02B 6/0038;
(Continued)

(56) References Cited

U.S. PATENT DOCUMENTS 5,801,885 A * 9/1998 Togino ............... G02B 27/0172
359/630
6,008,947 A * 12/1999 Togino ............... G02B 27/0172
359/630
(Continued)

FOREIGN PATENT DOCUMENTS

| KR | 1020140045292 | 4/2014 |
|---|---|---|
| KR | 1020140053341 | 5/2014 |
| WO | WO2016/011367 A2 | 1/2016 |

*Primary Examiner* — William R Alexander
(74) *Attorney, Agent, or Firm* — Mei & Mark LLP

(57) ABSTRACT

A head-mounted display apparatus is disclosed. The head-mounted display apparatus includes an optical member having a front surface, a rear surface, and a plurality of side surfaces, a display unit adapted to emit a display image toward one of the side surfaces of the optical member, and a reflective structure disposed inside the optical member to reflect the display image emitted from the display unit and to allow the reflected display image to pass and propagate through the rear surface. The image reflected by the reflective structure and delivered to user's eyes is the same irrespective of the coverage of the user's field of view.

19 Claims, 13 Drawing Sheets

(51) Int. Cl.
  *G06F 3/01* (2006.01)
  *G06T 19/00* (2011.01)
  *G02C 7/10* (2006.01)
  *H04N 13/332* (2018.01)
  *H04N 13/344* (2018.01)
  *G06F 1/16* (2006.01)

(52) U.S. Cl.
  CPC ............... *G02C 7/10* (2013.01); *G06F 1/163* (2013.01); *G06F 3/011* (2013.01); *G06T 19/006* (2013.01); *H04N 13/332* (2018.05); *H04N 13/344* (2018.05); *G02B 2027/0123* (2013.01); *G02B 2027/0178* (2013.01); *H04N 2213/001* (2013.01)

(58) Field of Classification Search
  CPC ...... G02B 2027/011; G02B 2027/0118; G02B 2027/0123; G02B 2027/0127; G02B 2027/0129; G02B 2027/0178
  USPC ................ 359/630, 631, 633, 636; 345/7–9; 351/153; 348/207.99
  See application file for complete search history.

(56) References Cited

U.S. PATENT DOCUMENTS

| | | | |
|---|---|---|---|
| 9,195,066 B2 * | 11/2015 | Komatsu | G02B 27/017 |
| 9,989,767 B2 * | 6/2018 | Dobschal | G02B 27/0172 |
| 10,133,532 B2 * | 11/2018 | Takano | G06F 3/1454 |
| 10,162,412 B2 * | 12/2018 | Nishizawa | G06F 3/013 |
| 2004/0061663 A1 * | 4/2004 | Reynolds | G02B 27/0176 345/8 |
| 2013/0088780 A1 * | 4/2013 | Jarvenpaa | G02B 5/18 359/566 |
| 2017/0255011 A1 * | 9/2017 | Son | G02B 5/3025 |
| 2018/0275405 A1 * | 9/2018 | Dobschal | G02B 6/34 |

* cited by examiner (a)

(b)

HEAD-MOUNTED DISPLAY APPARATUSES

TECHNICAL FIELD

The present disclosure relates to head-mounted display apparatuses, and more specifically to head-mounted display apparatuses that include an optical structure accommodating a reflective structure without having a need for a fixing mechanism, contributing to size and weight reduction, allow a user to view the same clear display image irrespective of a coverage of his/her field of view, and achieve virtual reality and augmented reality.

BACKGROUND

In recent years, a great deal of research has been conducted on head-mounted displays (HMDs). Eyewear display apparatuses operate in such a manner that enlarged images are allowed to come into sight. Such eyewear display apparatuses can offer two advantages: their structure is small enough to be wearable on the eyes and extended screens can be provided. Most conventional eyewear display apparatuses for micro-display applications are operated in such a manner that optical signals are reflected by a prism. One example of such eyewear display apparatuses is disclosed in KR 10-2014-0053341 (published on May 7, 2014). However, a volume and weight of a prism used in the eyewear display apparatus remain problematic. The use of the prism has become an obstacle to a diversification of the design of the eyewear display apparatus.

There has been an increasing demand for wearable devices, such as glasses and goggles, that can provide dynamic digital information with higher image quality in various applications, such as augmented reality systems. Nevertheless, conventional eyewear display apparatuses alone are insufficient in providing various designs and dynamic information with high image quality. As such, there is still a need for enhanced technology and/or techniques for providing various designs and dynamic information with high image quality.

SUMMARY

In an aspect of the present technology, head-mounted display apparatuses are provided, which can be attached to glass parts of eye-wearable devices, such as glasses or goggles, to diversify the design of the eye-wearable devices, making the eye-wearable devices compact in size and light in weight.

One aspect of the present technology provides a head-mounted display apparatus including an optical member having a front surface, a rear surface, and a plurality of side surfaces, a display unit adapted to emit a display image toward one of the side surfaces of the optical member, and a reflective structure disposed inside the optical member to reflect the display image emitted from the display unit and to allow the reflected display image to pass and propagate through the rear surface wherein the image reflected by the reflective structure and delivered to user's eyes is the same irrespective of the coverage of the user's field of view.

According to one embodiment, the display image may include incident light between the display unit and the one of the side surfaces of the optical member, refracted light propagating through the optical member as a medium after being refracted by the one of the side surfaces of the optical member, and output light exiting from the rear surface of the optical member after being reflected by the reflective structure.

According to one embodiment, the optical member may include a silicone material.

According to one embodiment, the head-mounted display apparatus further includes a glass part to which the optical member is attached and a frame to which the glass part is fixed.

According to one embodiment, the display unit may be mounted on the frame.

According to one embodiment, the reflective structure may include a micromirror arranged obliquely relative to a reference plane as a virtual plane extending from the front surface of the optical member to cover the reflective structure and the width (W) of an orthographic projection of the micromirror and the height (H) of the micromirror are determined depending on an angle of incidence of the display image on the micromirror, an angle of reflection of the display image from the micromirror, and a refractive index of the optical member.

According to one embodiment, the display unit may include a first light emitting diode (LED) display panel including a plurality of two-dimensionally arrayed first micro-LEDs to emit a first wavelength display image, a second LED display panel including a plurality of two-dimensionally arrayed second micro-LEDs to emit a second wavelength display image, and a third LED display panel including a plurality of two-dimensionally arrayed third micro-LEDs to emit a third wavelength display image.

According to one embodiment, the display unit may further include a single complementary metal oxide semiconductor (CMOS) backplane coupled to the first LED display panel, the second LED display panel, and the third LED display panel and including a plurality of CMOS cells corresponding to the first micro-LEDs, the second micro-LEDs, and the third micro-LEDs to individually drive the micro-LEDs in groups.

According to one embodiment, the display unit may further include bumps electrically connecting the micro-LEDs to the corresponding CMOS cells in a state in which the micro-LEDs and the CMOS cells are arranged to face each other.

According to one embodiment, the micro-LEDs may be formed by growing a first conductive semiconductor layer, an active layer, and a second conductive semiconductor layer in this order on a substrate and etching the layers; each of the micro-LEDs has a vertical structure including the substrate, the first conductive semiconductor layer, the active layer, and the second conductive semiconductor layer formed in this order; and the active layer and the second conductive semiconductor layer are removed from the exposed portions of each of the first LED display panel, the second LED display panel, and the third LED display panel where none of the micro-LEDs are formed, such that the first conductive semiconductor layer is exposed.

According to one embodiment, a first conductive metal layer may be formed over a portion of the first conductive semiconductor layer where none of the micro-LEDs of each of the first LED display panel, the second LED display panel, and the third LED display panel are formed.

A further aspect of the present technology provides a head-mounted display apparatus including an optical member having a first surface and a second surface and formed with a cut-away portion having a vertical plane and an inclined plane, a display unit adapted to emit a display image, and a micromirror arranged on the inclined plane of the cut-away portion formed in the optical member to reflect the display image emitted from the display unit and to allow the reflected display image to pass and propagate through the first surface wherein the width (W) of an orthographic projection (whose reference plane is defined as a virtual plane extending from the second surface to cover the cut-away portion) of the micromirror and the height (H) of the micromirror are determined depending on the angle of incidence of the display image on the micromirror, the angle of reflection of the display image from the micromirror, and the refractive index of the optical member.

The head-mounted display apparatuses of the present technology may be attached to glass parts of eye-wearable devices, such as glasses or goggles, to diversify the design of the eye-wearable devices, making the eye-wearable devices compact in size and light in weight, and can achieve virtual reality and augmented reality.

In addition, the head-mounted display apparatuses of the present technology may allow a display image reflected by the micromirror to fall at a constant position on the user's retina irrespective of whether the user see a distant or close object. Therefore, the use of the head-mounted display apparatuses according to the present technology can prevent the quality of a display image from deteriorating depending on the coverage of the user's field of view, compared to the use of conventional head-mounted display apparatuses.

Furthermore, the head-mounted display apparatuses of the present technology may allow an image provided through the micromirror from the display unit to fall on the retina, achieving multiple focusing. Therefore, the head-mounted display apparatuses of the present invention may be effective in relieving eye strain compared to conventional head-mounted display apparatuses.

Moreover, the head-mounted display apparatuses of the present technology may be attached to glass parts of eye-wearable devices, such as glasses or goggles, without having a need to modify the structure of the glass parts. Therefore, the head-mounted display apparatuses of the present technology are efficient in terms of cost and management.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Preferred embodiments of the present invention will now be described with reference to the accompanying drawings. It should be noted that the drawings and embodiments described with reference to the drawings are simplified and illustrated such that those skilled in the art can readily understand the present invention.

Figure 1:
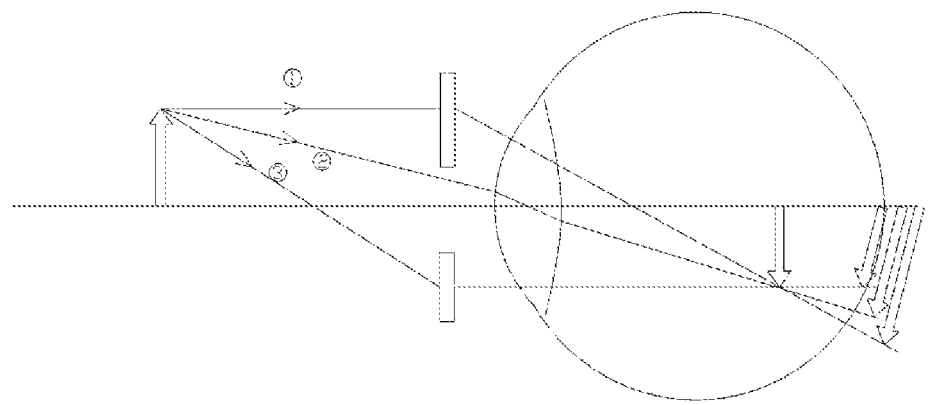
FIG. 1 is a view for explaining the pin hole effect associated with a head-mounted display apparatus according to one embodiment of the present invention.

FIG. 1 is a view for explaining the pin hole effect applied to a head-mounted display apparatus according to one embodiment of the present invention. As illustrated, for a short-sighted user, an image is focused in front of the retina. Images of ①, ②, and ③ marked with arrows overlap and are blurred on the retina. However, as illustrated in FIG. 1, when the portions ① and ③ of light are blocked before entering the lens of the eye and only the portion ② is allowed to enter the lens of the eye through a pin hole, a clear image is focused on the retina. This result arises from the effect of the pin hole on the image.

One embodiment of the present invention based on the pin hole effect will be explained with reference to FIGS. 2 to 8. As illustrated in these figures, a display image is emitted from a display unit 20, is reflected by a reflective structure disposed in an optical member 10, passes through a rear surface of the optical member 10, and reaches a user's eye. In this embodiment, the reflective structure includes a reflective member 14 and a pin hole 12 accommodating the reflective member 14.

In FIGS. 2, 3, 6, 7, and 8, the display image includes incident light L1, refracted light L2, and output light L3, each of which is represented by a single straight line to assist in understanding. In actuality, the straight line is meant to include display images (i.e. image lights) emitted from a plurality of micro-LEDs of the display unit 20.

Figure 2:
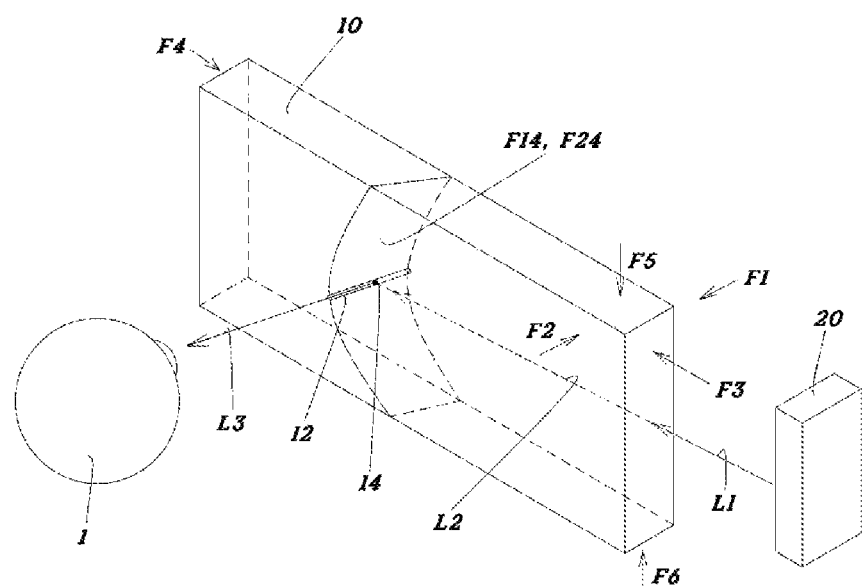
FIG. 2 is a view for explaining a head-mounted display apparatus according to one embodiment of the present invention.
Figure 3:
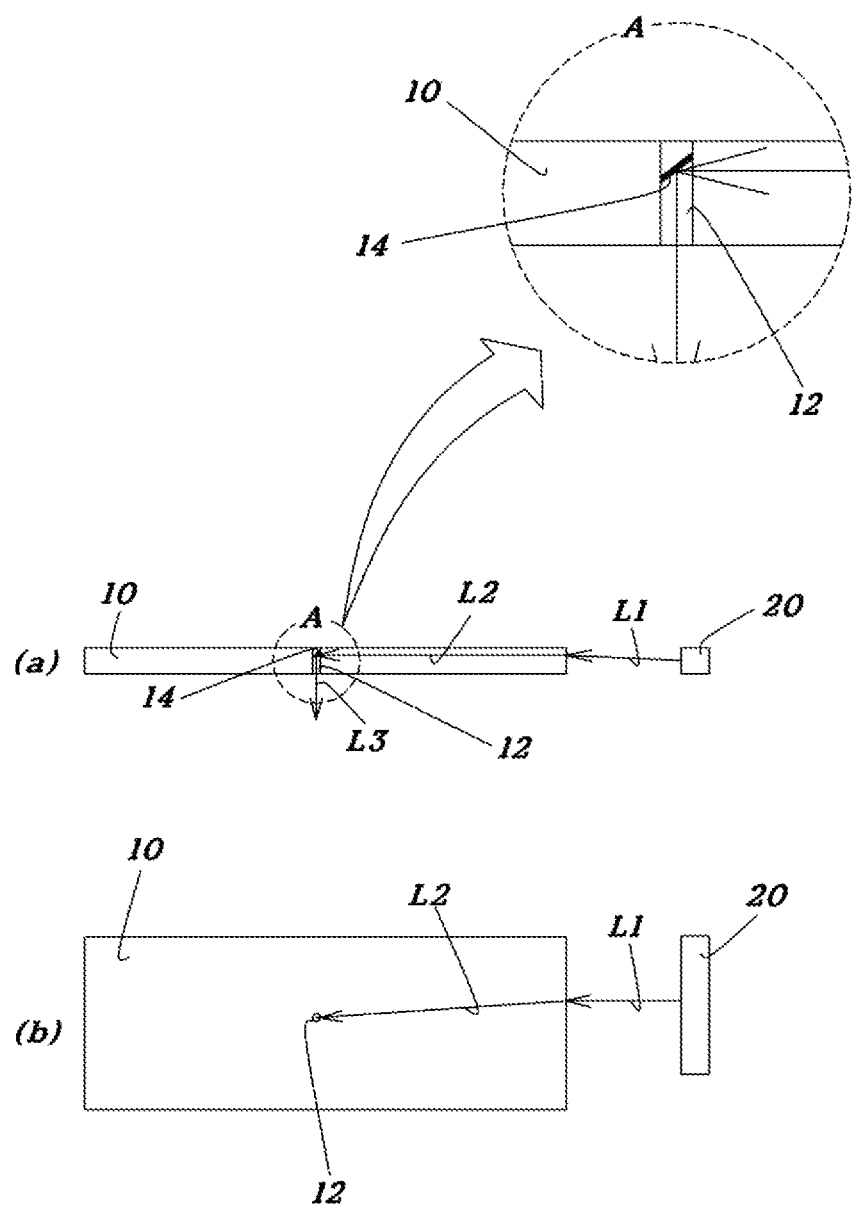
FIG. 3 explains the propagation of a display image from a display unit 20 to a user's eye through an optical member 10 and a pin hole 12 in the head-mounted display apparatus of FIG. 2, as viewed from (a) F5 and (b) F2.
Figure 4:
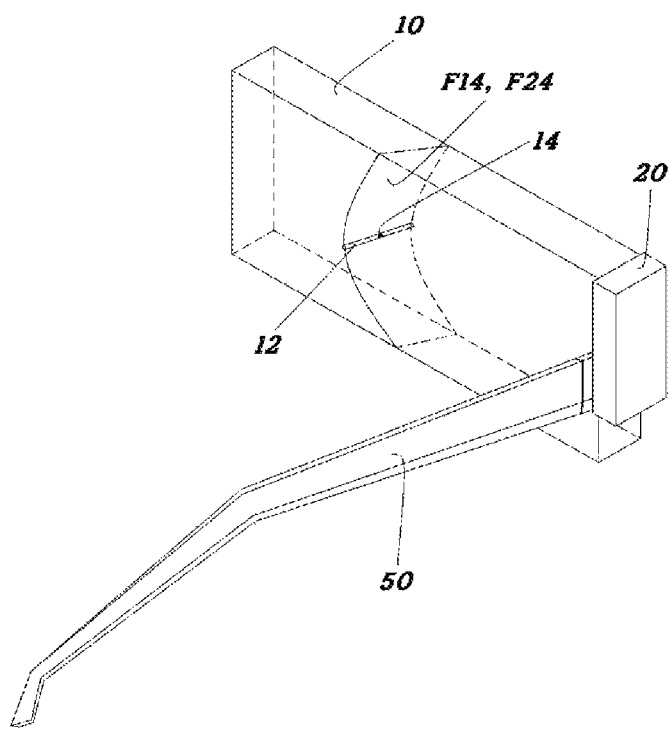
FIG. 4 is a view for explaining an embodiment of the head-mounted display apparatus of FIG. 2.
Figure 5:
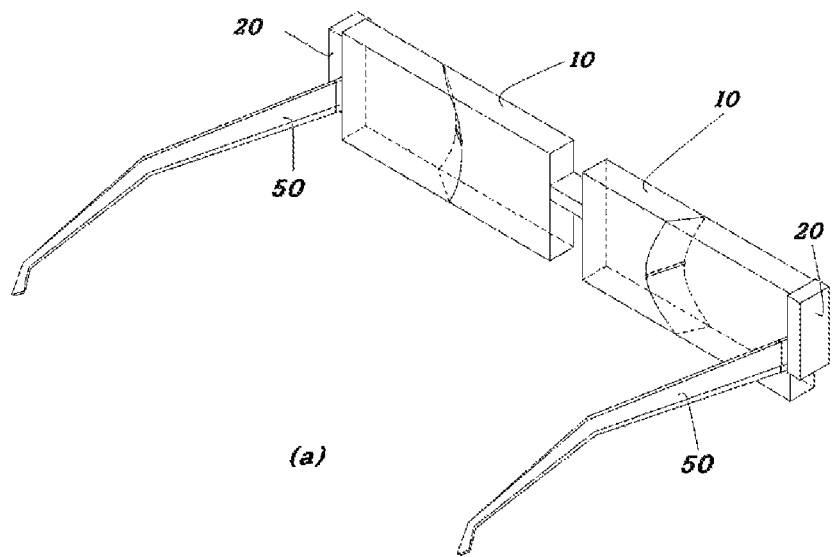
FIG. 5 illustrates embodiments of the head-mounted display apparatus of FIG. 2 applied to goggles.
Figure 5:
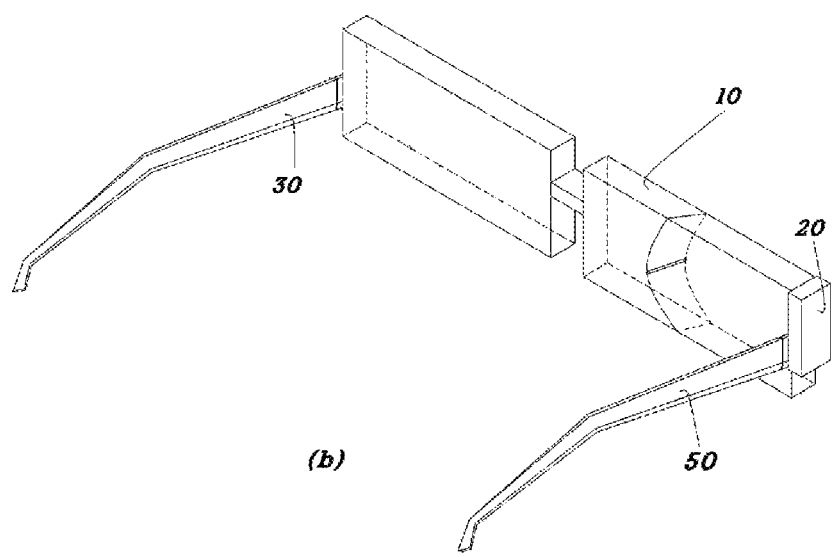
Figure 6:
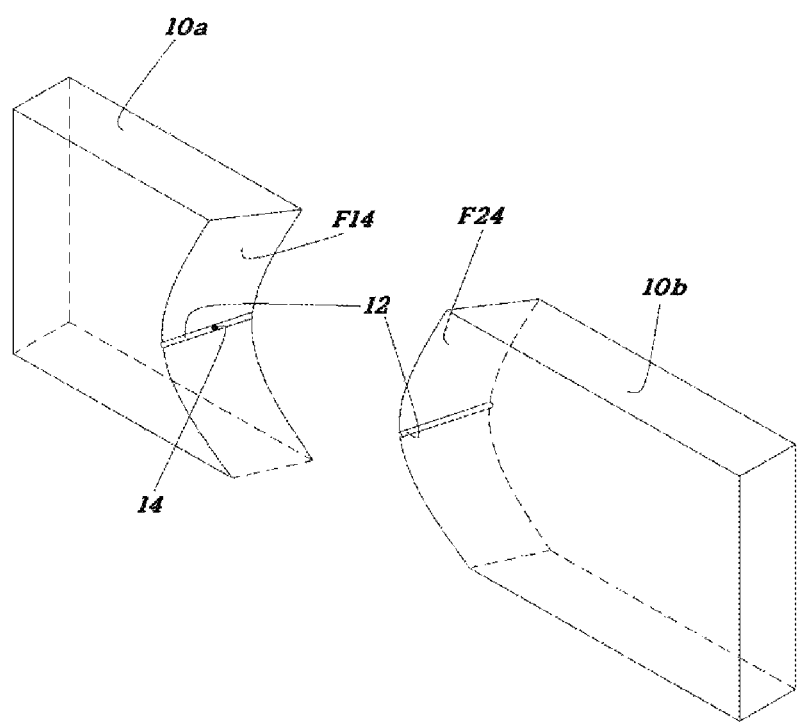
FIG. 6 illustrates an exemplary procedure for manufacturing the optical member 10 of the head-mounted display apparatus of FIG. 2 in which a first part 10a having a concave surface F14 and a second part 10b having a convex surface F24 are separately prepared and the two parts are arranged such that the concave surface F14 is in face-to-face contact with the convex surface F24.
Figure 7:
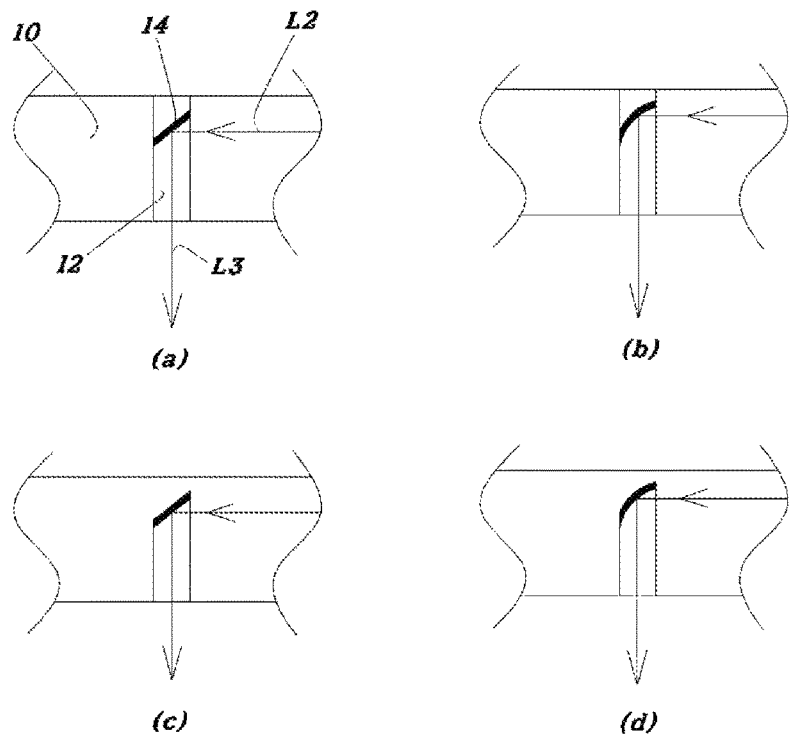
FIG. 7 illustrates exemplary pin holes 12 and reflective members 14 of the head-mounted display apparatus of FIG. 2: each of (a) and (b) illustrates a pin hole penetrating from a front surface of the optical member to a rear surface thereof, each of (c) and (d) illustrates a pin hole extending to a middle portion of the optical member, each of (a) and (c) illustrates a planar reflective member, and each of (b) and (d) illustrates a concave reflective member.
Figure 8:
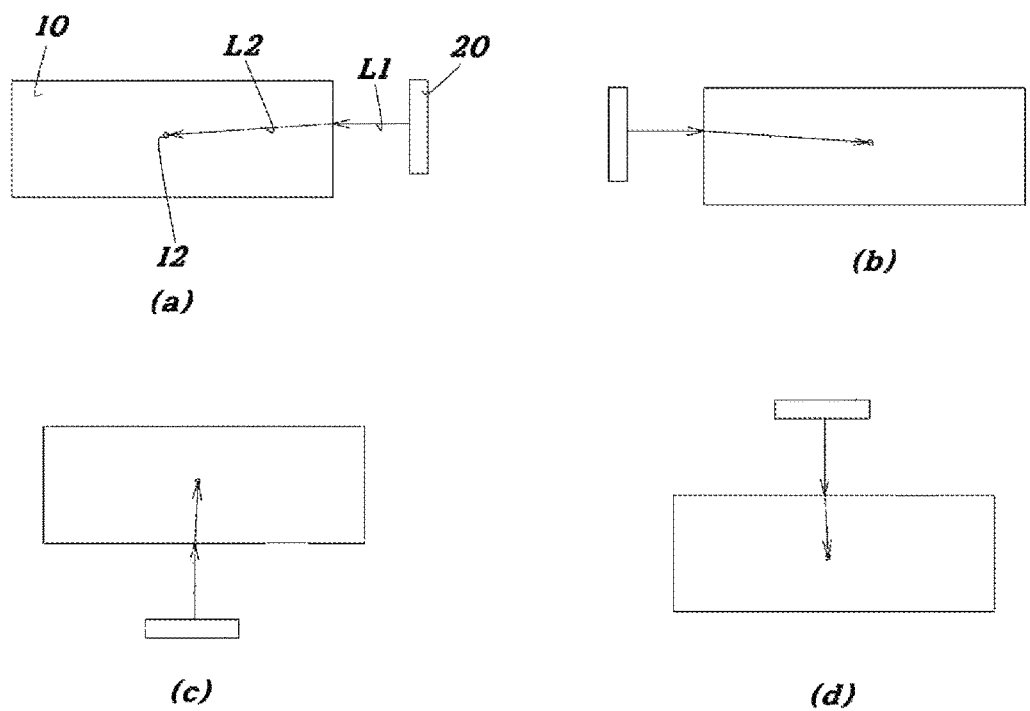
FIG. 8 illustrates various exemplary arrangements of the display unit 20 in the head-mounted display apparatus of FIG. 2, (a) on the right, (b) on the left, (c) below, and (d) above the optical member.

Specifically, FIG. 2 is a view for explaining a head-mounted display apparatus according to one embodiment of the present invention, FIG. 3 explains the propagation of a display image from a display unit 20 to a user's eye through an optical member 10 and a pin hole 12 in the head-mounted display apparatus of FIG. 2, as viewed from (a) F5 and (b) F2, FIG. 4 is a view for explaining an embodiment of the head-mounted display apparatus of FIG. 2, FIG. 5 illustrates embodiments of the head-mounted display apparatus of FIG. 2 applied to goggles, FIG. 6 illustrates an exemplary procedure for manufacturing the optical member 10 of the head-mounted display apparatus of FIG. 2 in which a first part 10a having a concave surface F14 and a second part 10b having a convex surface F24 are separately prepared and the two parts are arranged such that the concave surface F14 is in face-to-face contact with the convex surface F24, FIG. 7 illustrates exemplary pin holes 12 and reflective members 14 of the head-mounted display apparatus of FIG. 2: each of (a) and (b) illustrates a pin hole penetrating from a front surface of the optical member to a rear surface thereof, each of (c) and (d) illustrates a pin hole extending to a middle portion of the optical member, each of (a) and (c) illustrates a planar reflective member, and each of (b) and (d) illustrates a concave reflective member, and FIG. 8 illustrates various exemplary arrangements of the display unit 20 in the head-mounted display apparatus of FIG. 2, (a) on the right, (b) on the left, (c) below, and (d) above the optical member.

Referring first to FIG. 2, the optical member 10 has a front surface F1, a rear surface F2, and a plurality of side surfaces F3, F4, F5, and F6. A pin hole 12 is formed in the optical member 10. The pin hole 12 penetrates from the rear surface F2 to the front surface F1. Assuming that a user wears the head-mounted display apparatus on his/her eye 1, the front surface F1 refers to the surface of the optical member 10 that is distant from the eye 1, that is, the surface of the optical member 10 that is opposite to the eye 1, and the rear surface F2 refers to the surface of the optical member 10 of the optical member 10 that is close to the eye 1, that is, the surface of the optical member 10 that faces the eye 1. Examples of materials for the optical member 10 include, but are not limited to, glass, polycarbonate, and acrylic resins.

The pin hole 12 is circular in cross section and is typically from 0.1 mm to 2 mm in diameter. The pin hole 12 may extend to a middle portion of the optical member 10 or may penetrate from the rear surface F2 of the optical member 10 to the front surface thereof. FIG. 2 illustrates the pin hole 12 extending between the front surface F1 and the rear surface F2 of the optical member 10. The relationships between the pin hole 12 and the reflective member 14 of the optical member 10 will be explained below with reference to FIG. 7.

The reflective member 14 is located in the pin hole 12 to reflect a display image. The display image reflected by the reflective member 14 passes through the pin hole 12, exits through the rear surface F2 of the optical member 10, and reaches the eye 1.

With reference to FIG. 7, an explanation will be given of the cross-section and location of the reflective member 14 and the relationship between the reflective member 14 and the pin hole 12. In FIG. 7, (a) illustrates that the pin hole 12 penetrates from the rear surface F2 of the optical member 10 to the front surface F1 thereof and the reflective member 14 is planar, (b) illustrates that the pin hole 12 penetrates from the rear surface F2 of the optical member 10 to the front surface F1 thereof and the reflective member 14 and the reflective member 14 is in the shape of a concave lens, (c) illustrates that the pin hole 12 extends to a middle portion of the optical member 10 and the reflective member 14 is planar, and (d) illustrates that the pin hole 12 extends to a middle portion of the optical member 10 and the reflective member 14 is in the shape of a concave lens. The reflective member 14 is not limited to the shapes illustrated in (a) to (d) of FIG. 7 and may be modified into any other shape that is advantageous for viewing high-quality images with the eye. As illustrated in (c) and (d) of FIG. 7, when the pin hole 12 extends to a middle portion of the optical member 10, the reflective member 14 is located in the middle portion of the optical member 10, that is, at the point where the pin hole 12 begins. Alternatively, when the pin hole 12 penetrates from the rear surface F2 of the optical member 10 to the front surface F1 thereof, as illustrated in (a) and (b) of FIG. 7, the reflective member 14 is located at a middle point of the pin hole 12 in the middle portion of the optical member 10.

The display unit 20 is an element through which a display image is output toward the optical member 10. The display unit 20 includes a plurality of micro-LEDs.

The display unit 20 is arranged opposite to one of the side surfaces F3, F4, F5, and F6 of the optical member 10 to output a display image toward the optical member 10. The display image emitted from the plurality of micro-LEDs of the display unit 20 propagates through the optical member 10 as a medium, is reflected by the reflective member 14, passes through the pin hole 12, exits from the rear surface F2, and reaches the eye 1. Exemplary embodiments of the display unit 20 will be explained in detail with reference to the corresponding drawings.

A display image emitted from the display unit 20 is divided into incident light L1 between the display unit 20 and the side surface F3, refracted light L2 propagating through the optical member 10 as a medium after being refracted by the side surface F3, and output light L3 propagating through the pin hole 12 and exiting from the rear surface F2 of the optical member 10 after being reflected by the reflective member 14, as illustrated in FIGS. 2 and 3. As illustrated in an enlarged view of portion "A" of FIG. 3, the refracted light L2 propagating through the optical member 10 as a medium is reflected by the reflective member 14 located in the pin hole 12 and the output light L3 passes through the pin hole 12 and reaches the eye 1 after being reflected by the reflective member 14.

Thus, the head-mounted display apparatus of the present invention enables the delivery of the same quality of images to the user's eye through the pin hole irrespective of the coverage of the user's field of view, and as a result, a high-quality display image is always focused on the user's optic nerve. Therefore, the use of the head-mounted display apparatus according to the present invention can prevent a display image from being blurred depending on the coverage of the user's field of view, compared to the use of conventional head-mounted display apparatuses.

As illustrated in FIG. 4, the head-mounted display apparatus of the present invention can be fabricated by coupling the display unit 20 to a frame 50. Further, the head-mounted display apparatus of the present invention may be applied to wearable glasses or goggles. The head-mounted display apparatus of the present invention may be provided in pair, as illustrated in (a) of FIG. 5. Alternatively, the head-mounted display apparatus of the present invention may be mounted in only one of the glass or goggle lenses, as illustrated in (b) of FIG. 5.

Various methods may be used to manufacture the reflective structure of the head-mounted display apparatus in which the pin hole 12 is formed in the optical member 10 and the reflective member 14 is arranged in the pin hole 12. FIG. 6 illustrates an exemplary method for manufacturing the reflective structure. Specifically, the optical member 10 is manufactured by separately preparing a first part 10a having a concave surface F14 and a second part having a convex surface F24 and arranging the two parts such that the concave surface F14 is in face-to-face contact with the convex surface F24. In this case, surface processing needs to be done such that the concave surface F14 comes into face-to-face contact with the convex surface F24 over the largest possible area. The pin hole 12 is formed at the interface where the concave surface F14 is in face-to-face contact with the convex surface F24 and the reflective member 14 is arranged in the pin hole 12.

As illustrated in FIG. 8, the display unit 20 may be arranged (a) on the right side of the optical member 10, (b) on the left side of the optical member 10, (c) below the optical member 10 or (d) above the optical member 10.

FIGS. 9 to 18 illustrate head-mounted display apparatuses according to other embodiments of the present invention. Each of the head-mounted display apparatuses includes an optical member 10 and a reflective structure disposed in the optical member 10. The reflective structure includes a cut-away portion 12 and a micromirror 30 arranged on a slope of the cut-away portion 12.

Also in FIGS. 9 to 18, a display image includes incident light L1, L11, and L12, refracted light L2, L21, and L22, reflected light L3, L31, and L32, and output light L4, L41, and L42, each of which is represented by a single straight line to assist in understanding. In actuality, the straight line is meant to include display images (i.e. image lights) emitted from a plurality of micro-LEDs of the display unit 20.

Figure 9:
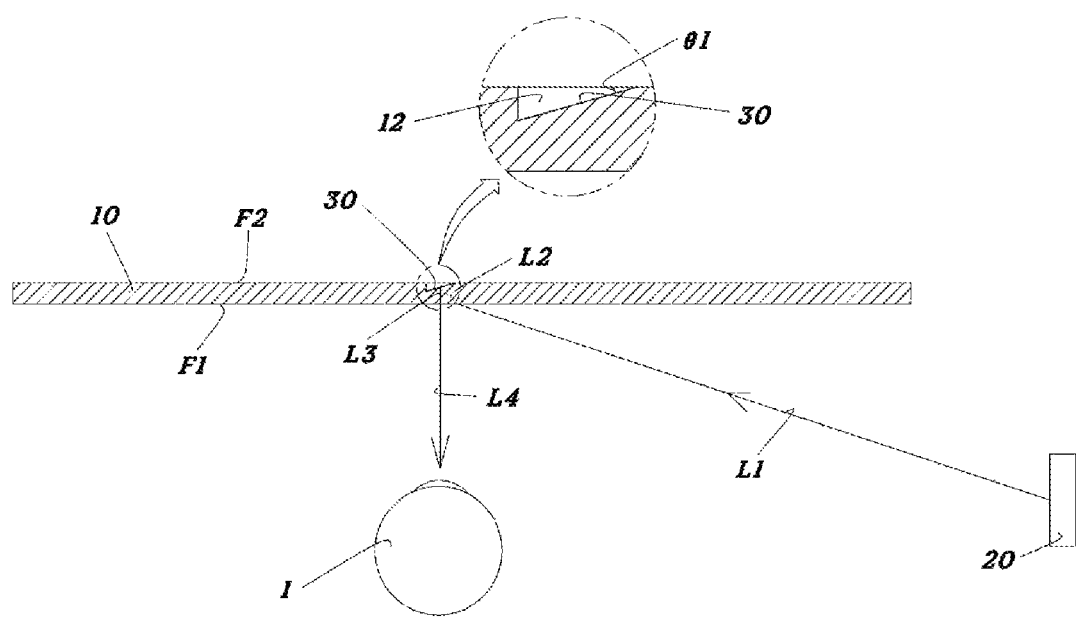
FIG. 9 illustrates a head-mounted display apparatus according to a further embodiment of the present invention.
Figure 10:
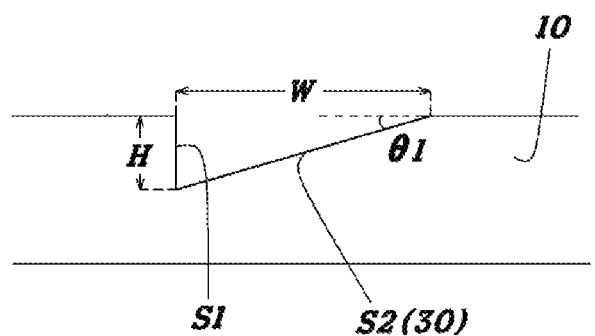
FIG. 10 illustrates the structure of a cut-away portion formed in an optical member of the head-mounted display apparatus of FIG. 9.

Referring first to FIG. 9, the optical member 10 has a first surface F1 and a second surface F2. Assuming that a user wears the head-mounted display apparatus on his/her eye 1, the first surface F1 is the rear surface of the optical member that faces the eye 1 and the second surface F2 is the front surface of the optical member that is opposite to the eye 1. Examples of materials for the optical member 10 include, but are not limited to, silicone, glass, polycarbonate, and acrylic resins. The cut-away portion 12 of the optical member 10 is formed at the second surface F2 and the micromirror 30 is arranged obliquely in the cut-away portion 12. The display unit 20 is an element through which a display image L1 is output toward the micromirror 30. The micromirror 30 is an element that reflects a display image emitted from the display unit 20. The reflected display image passes through the first surface F1, reaches the eye 1, and is focused on the retina. The micromirror 30 is planar and its location may vary depending on the locations of the user's both eyes, the distance between the user's eyes, and the size of the user's face.

Referring to FIGS. 9 to 13, the cut-away portion 12 of the optical member 10 has a vertical plane S1 and an inclined plane S2. The vertical plane S1 is formed by vertically cutting out a portion of the optical member 10 and extends from the second surface F2 to the lowest portion of the inclined plane S2. The height of the vertical plane S1 is represented by "H". The inclined plane S2 is the bottom surface of the cut-away portion 12 on which the micromirror 30 is disposed. As illustrated, the cross-section of the cut-away portion 12 takes the shape of a right triangle. The inclined plane S2 corresponds to the hypotenuse of the right triangle and the vertical plane S1 corresponds to one of the two sides meeting at a right angle. The micromirror 30 is formed on the inclined plane S2. When a reference plane is defined as a virtual plane extending from the second surface F2 to cover the cut-away portion 12, the cross-section of an orthographic projection of the micromirror relative to the virtual plane corresponds to the other side forming a right angle with the vertical plane and is represented by the width (W) of the orthographic projection of the micromirror. The height of the micromirror 30 can be considered the height (H) of the vertical plane S1 because the micromirror 30 is disposed on the inclined plane S2.

The slope of the inclined plane S2 or the slope of the micromirror 30 is represented by $\theta_1$, which can determine the height (H) of the vertical plane S1 and the width (W) of the orthographic projection of the micromirror. In order for a display image emitted from the display unit 20 to reach the eye 1 through the optical member 10 and the micromirror 30, the slope ($\theta_1$) of the micromirror 30, that is to say, the height (H) of the vertical plane S1 and the width (W) of the orthographic projection of the micromirror 20, should be determined depending on the angles of incidence ($\theta_{03}$ and $\theta_{05}$ in FIG. 12) of the display image L2 incident on the micromirror 30, the angles of reflection ($\theta_2$ and $\theta_4$ in FIG. 12) of the display image L3 from the micromirror 30, and the refractive index of the optical member 10.

Figure 13:
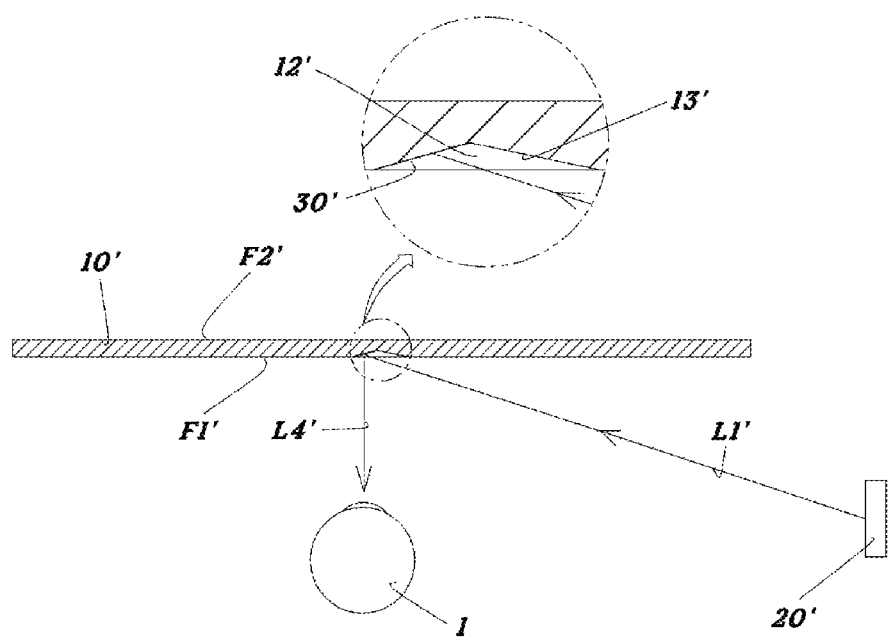
FIG. 13 illustrates a head-mounted display apparatus according to another embodiment of the present invention.

As illustrated in FIG. 9, the cut-away portion 12 of the optical member 10 is formed at the second surface F2 and the micromirror 30 is disposed on the inclined plane S2 of the cut-away portion 12. Alternatively, a cut-away portion 12' may be formed at a first surface F1', as illustrated in FIG. 13. Also in this case, a micromirror 30' may be arranged obliquely in the cut-away portion 12'. In order not to impede the propagation of a display image (i.e. incident light L1') from a display unit 20' toward the micromirror 30', it is preferred that an inclined portion 13' of the cut-away portion 12' on which the micromirror 30' is not disposed has a larger angle than the angle of incidence of the incident light L1'.

Figure 11:
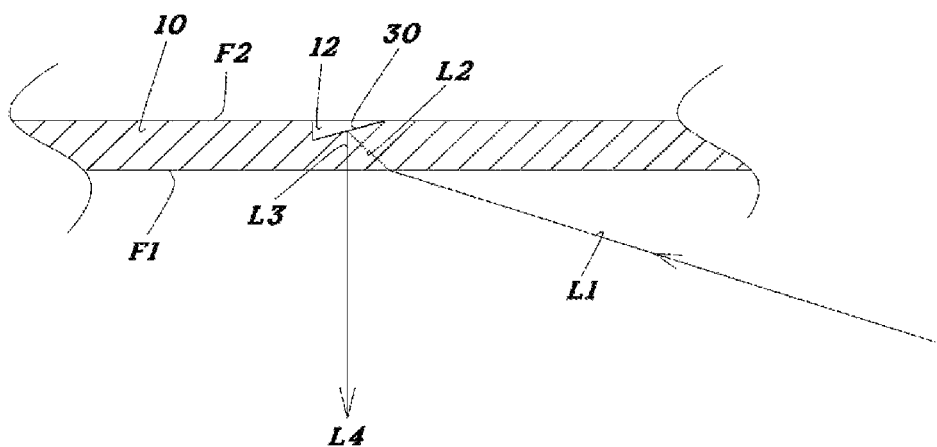
FIG. 11 schematically explains the propagation of a display image before reaching a user's eye.

The display unit 20 is an element through which a display image is output toward the optical member 10. The display unit 20 includes a plurality of micro-LEDs. The display unit 20 is located to face the first surface F1 to output a display image toward the optical member 10. The display image emitted from the plurality of micro-LEDs of the display unit 20 is refracted by the first surface F1, reflected by the micromirror 30, again refracted by the first surface F1, and reaches the eye 1, as illustrated in FIGS. 9 and 11.

With reference to FIGS. 9 to 12, a detailed explanation will be given of the propagation of a display image emitted from the display unit. A display image emitted from the display unit 20 can be divided into incident light L1 (L11 and L12 in FIG. 12) propagating between the display unit 20 and the optical member 10, refracted light L2 (L21 and L22 in FIG. 12) refracted by the first surface F1 of the optical member 10 as a medium and propagating through the optical member 10 as a medium before being reflected by the micromirror 30, reflected light L3 (L31 and L32 in FIG. 12) reflected by the micromirror 30 and propagating through the optical member 10 to reach the first surface F1, and output light L4 (L41 and L42 in FIG. 12) exiting from the first surface F1. Finally, the output light L4 reaches the eye 1. The same output light L4 (that is, the output display image) is delivered to the eye irrespective of the coverage of the user's field of view. Thus, a high-quality display image is always focused on the user's retina. Therefore, the use of the head-mounted display apparatus according to the present invention can prevent a display image from being blurred depending on the coverage of the user's field of view, compared to the use of conventional head-mounted display apparatuses.

Figure 12:
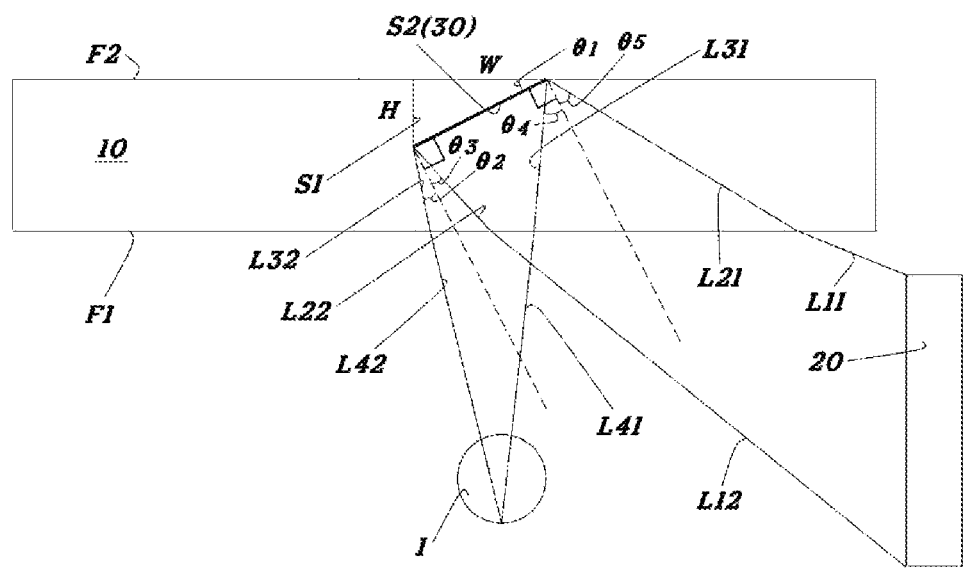
FIG. 12 is a view for explaining the inclination factors of a micromirror.

FIG. 12 illustrates the propagation of a display image from the display unit 20 to the eye 1 through the optical member 10 and the micromirror 30. As illustrated in FIG. 12, some fundamental factors should be taken into consideration when the optical member 10 and the micromirror 30 are manufactured. Specifically, the refractive index of the optical member 10 should be considered because a display image enters the optical member 10 through the first surface F1 and leaves the optical member 10 before reaching the eye. Further, the angles of incidence ($\theta_{03}$ and $\theta_{05}$) of the display image on the micromirror 30 are equal to the angles of reflection ($\theta_{02}$ and $\theta_{04}$) of the display image from the micromirror 30, respectively. Therefore, taking into consideration these factors, the angle of inclination ($\theta_{01}$) of the micromirror 30, the height (H) of the vertical plane S1, and the width (W) of the orthographic projection of the micromirror 30 shall be determined.

Figure 14:
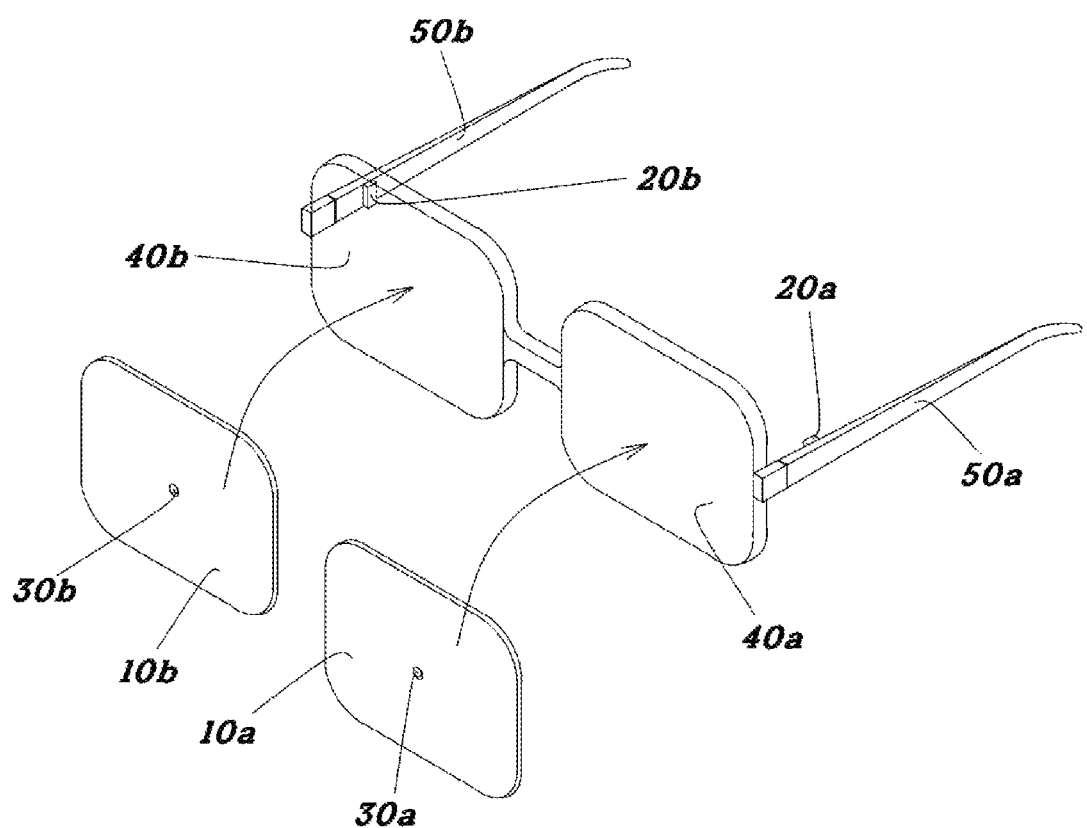
FIG. 14 illustrates a head-mounted display apparatus according to another embodiment of the present invention.

FIG. 14 illustrates a head-mounted display apparatus according to another embodiment of the present invention. As illustrated in FIG. 14, optical members 10a and 10b are attached to glass parts 40a and 40b, respectively. Specifically, first surfaces F1 and F1' of the optical members 10a and 10b may be attached to the glass parts 40a and 40b, respectively. In this case, the glass parts 40a and 40b are the surfaces of glass lenses that are opposite to user's both eyes. Alternatively, second surfaces F2 and F2' of the optical members 10a and 10b may be attached to the glass parts 40a and 40b, respectively. In this case, the glass parts 40a and 40b are the surfaces of glass lenses that face user's both eyes.

Referring to FIG. 14, the head-mounted display apparatus employs micromirrors and further includes frames 50a and 50b in addition to the glass parts 40a and 40b. The optical members 10a and 10b are attached to the glass parts 40a and 40b, respectively. The frames 50a and 50b fix the glass parts 40a and 40b, respectively. Particularly, the frames 50a and 50b are elements that allow a user to hang the head-mounted display apparatus on his/her both ears. Display units 20a and 20b are attached to appropriate positions of the frames 50a and 50b, respectively. The optical members 10a and 10b are preferably made of a silicone material. The tackiness of the silicone material facilitates the attachment of the optical members 10a and 10b to the glass parts 40a and 40b, respectively. Any transparent material may be used for the optical members 10a and 10b so long as it can be maintained attached to the glass parts. The micromirrors are indicated by reference numerals 30a and 30b.

Figure 15:
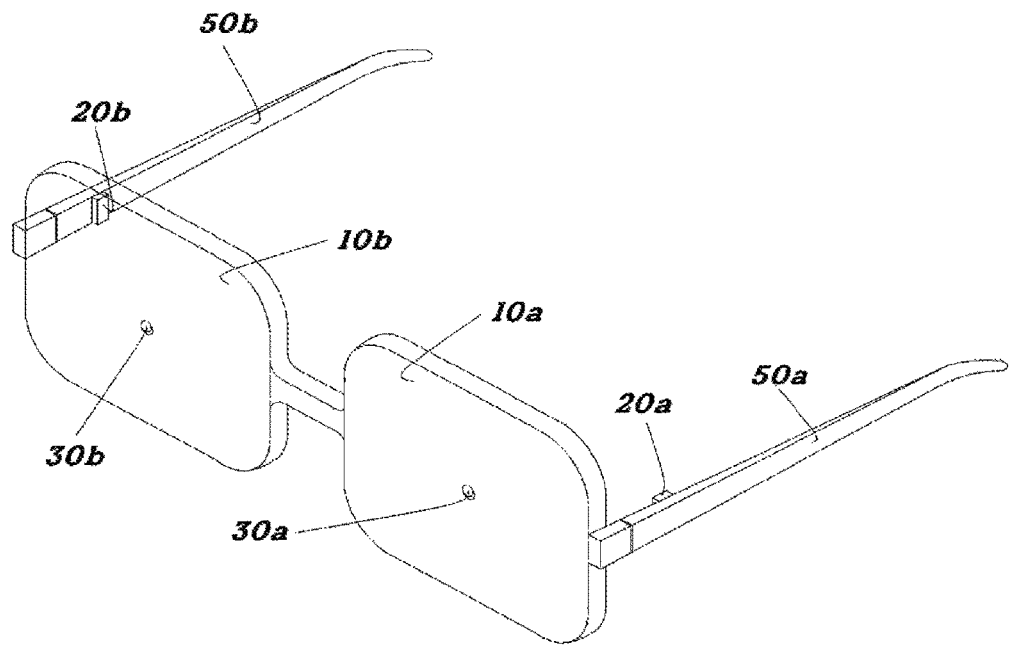
FIG. 15 illustrates a head-mounted display apparatus according to another embodiment of the present invention.

FIG. 15 illustrates a head-mounted display apparatus employing micromirrors according to another embodiment of the present invention. As illustrated in FIG. 15, optical members 10a and 10b are manufactured in the form of glass lenses as glass parts. Also in this case, display units 20a and 20b are mounted at appropriate positions of frames 50a and 50b, respectively.

When the embodiment of FIG. 14 is compared with that of FIG. 15, the head-mounted display apparatus of FIG. 14 can be fabricated at a reduced cost because it uses general glasses including glass parts and frames without further modification, unlike the head-mounted display apparatus of FIG. 15. Another advantage of the head-mounted display apparatus of FIG. 14 is that the micromirrors can be replaced with normal ones when damaged, contributing to a reduction in maintenance cost.

Figure 16:
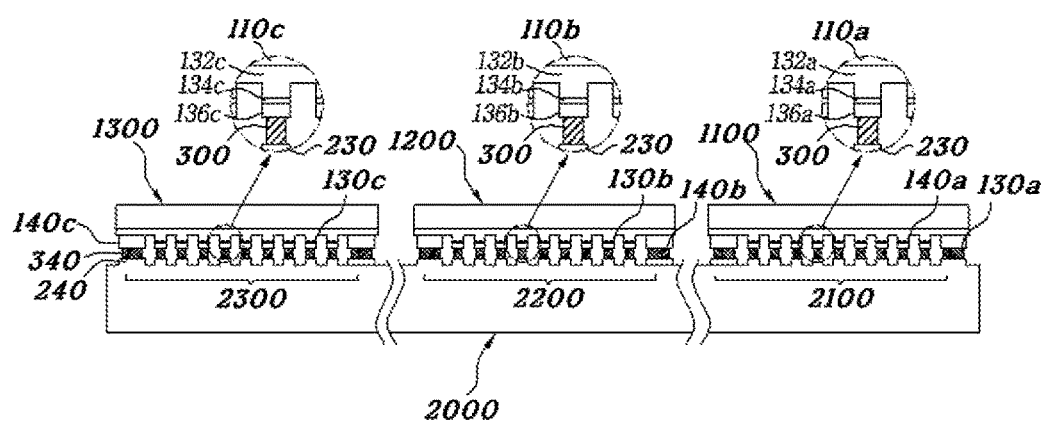
FIG. 16 is a detailed view illustrating one example of a display unit 20 of a head-mounted display apparatus according to the present invention.
Figure 17:
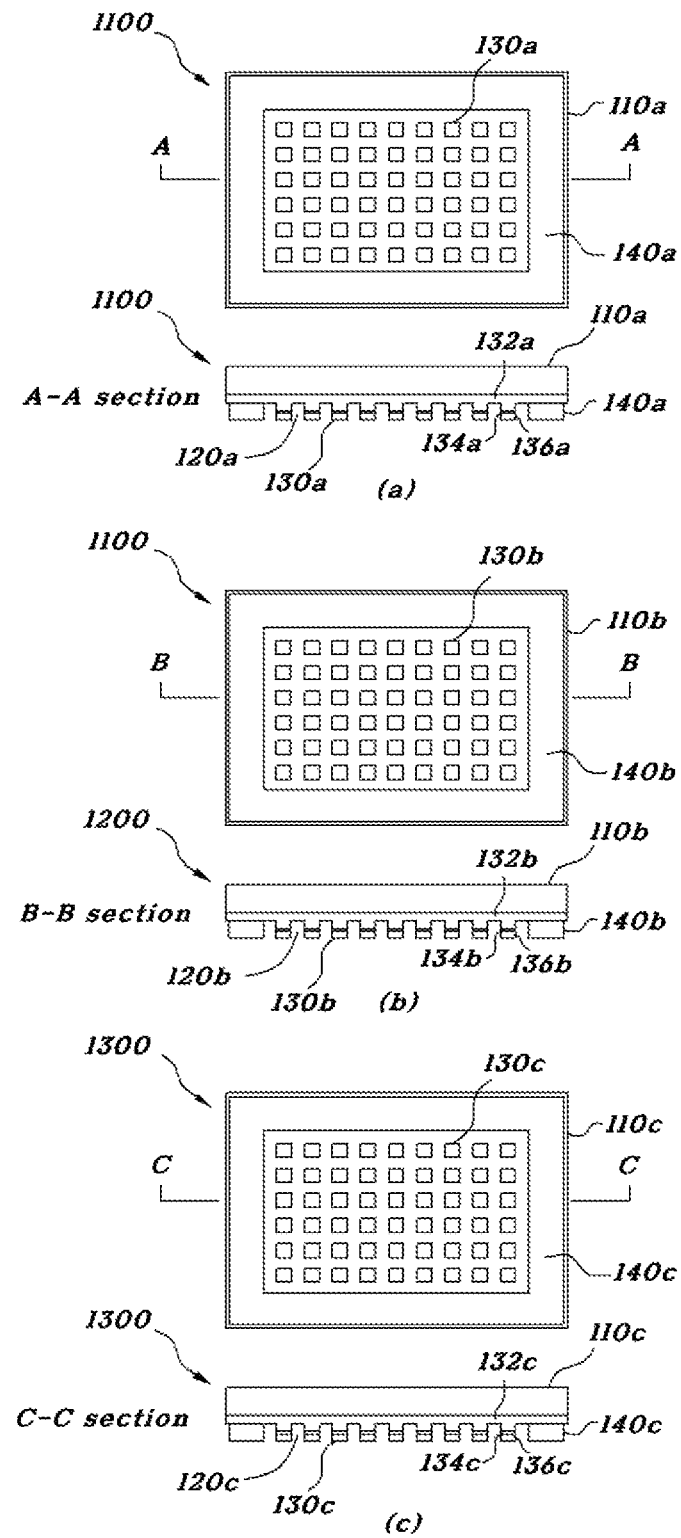
FIG. 17 illustrates (a) first, (b) second, and (c) third LED display panels of the display unit 20 illustrated in FIG. 16.
Figure 18:
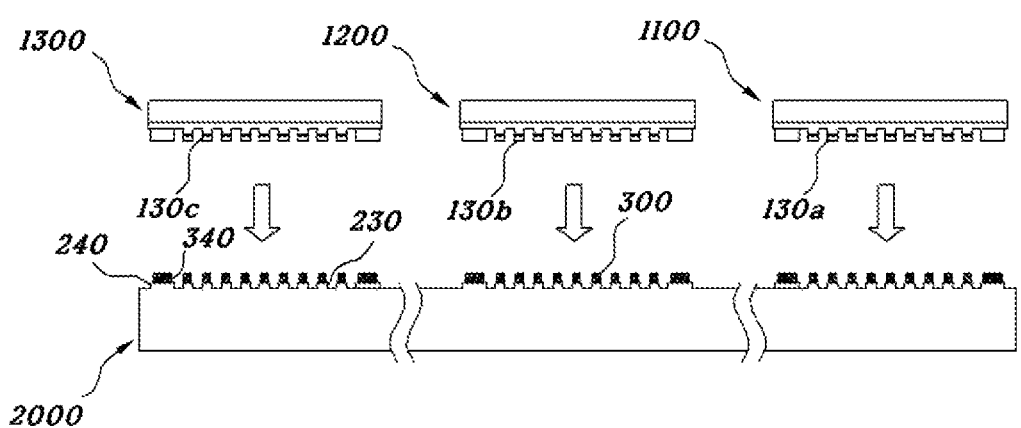
FIG. 18 illustrates a method for constructing the display unit 20 by coupling the first, second, and third LED display panels illustrated in FIG. 17 to a CMOS panel.

FIG. 16 is a detailed view illustrating one example of a display unit 20 of a head-mounted display apparatus according to the present invention, FIG. 17 illustrates (a) a first LED display panel, (b) a second LED display panel, and (c) a third LED display panel of the display unit 20 illustrated in FIG. 16, and FIG. 18 illustrates a method for constructing the display unit 20 by coupling the first, second, and third LED display panels illustrated in FIG. 16 to a CMOS panel.

Referring first to FIG. 16, the display unit 20 includes first, second, and third LED display panels 1100, 1200, and 1300, which include a plurality of two-dimensionally arrayed micro-LEDs 130a, 130b, and 130c, respectively.

The first, second, and third display panels 1100, 1200, and 1300 emit display images of different wavelength bands. More specifically, the first LED display panel 1100 is designed to emit red display images, the second LED display panel 1200 is designed to emit green display images, and the third LED display panel 1300 is designed to emit blue display images. The display unit 20 includes a single CMOS backplane 2000 adapted to individually drive the micro-LEDs 130a, 130b, and 130c of the first LED display panel 1100, the second LED display panel 1200, and the third LED display panel 1300 to achieve full color. The single CMOS backplane 2000 includes a plurality of CMOS cells 230 corresponding to the micro-LEDs 130a, 130b, and 130c of the first, second, and third LED display panels 1100, 1200, and 1300. The CMOS backplane 2000 has CMOS cell areas 2100, 2200, and 2300 in which the first, second, and third LED display panels 1100, 1200, and 1300 are arranged, respectively. The first, second, and third LED display panels 1100, 1200, and 1300 are flip-chip bonded to the CMOS cell areas 2100, 2200, and 2300, respectively. The CMOS cells 230 are electrically connected to the LED cell 130a, 130b, and 130c by flip-chip bonding of the LED display panels 1100, 1200, and 1300 to the single CMOS backplane 2000. For this electrical connection, the plurality of CMOS cells 230 corresponding to the plurality of micro-LEDs of the LED display panels 1100, 1200, and 1300 are formed in the CMOS cell areas 2100, 2200, and 2300, respectively. The CMOS cells 230 are electrically connected to the micro-LEDs 130a, 130b, and 130c through bumps 300.

A common cell 240 is formed in each of the CMOS cell areas 2100, 2200, and 2300 on the single CMOS backplane 2000. The common cells 240 are electrically connected to first conductive metal layers of the LED display panels 1100, 1200, and 1300 through common bumps 340.

In the current state of the art, it is difficult to form structures emitting red, green, and blue display images on a single substrate in the construction of a display unit. In the present invention, the plurality of independently constructed LED display panels emitting red, green, and blue lights of different wavelength bands are flip-chip bonded to the single CMOS backplane 2000.

The display unit 20 is driven in response to control signals from a drive IC. The control signals from the drive IC are transmitted to the micro-LEDs 130a, 130b, and 130c by the CMOS cells 230 (i.e. CMOS integrated circuits) formed in the CMOS backplane 2000. The control signals from the drive IC may be analog or digital signals. The digital signals may also be pulse width modulation (PWM) signals.

The first, second, and third LED display panels of the display unit 20 illustrated in FIG. 16 are illustrated in (a), (b), and (c) FIG. 17, respectively. Referring first to (a), (b) and (c) of FIG. 17, the LED display panels 1100, 1200, and 1300 are formed by growing first conductive semiconductor layers 132a, 132b, and 132c, active layers 134a, 134b, and 134c, and second conductive semiconductor layers 136a, 136b, and 136c in this order on transparent substrates 110a, 110b, and 110c, respectively, followed by etching. The resulting micro-LEDs 130a, 130b, and 130c formed on the first, second, and third LED display panels 1100, 1200, and 1300 have vertical structures including the first conductive semiconductor layers 132a, 132b, and 132c, the active layers 134a, 134b, and 134c, and the second conductive semiconductor layers 136a, 136b, and 136c on the transparent substrates 110a, 110b, and 110c, respectively.

The transparent substrates 110a, 110b, and 110c are made of a material selected from sapphire, SiC, Si, glass, and ZnO. The first conductive semiconductor layers 132a, 132b, and 132c may be n-type semiconductor layers and the second conductive semiconductor layers 136a, 136b, and 136c may be p-type semiconductor layers. The active layers 134a, 134b, and 134c are regions where electrons from the first conductive semiconductor layers 132a, 132b, and 132c recombine with holes from the second conductive semiconductor layer 136a, 136b, and 136c when power is applied.

The second conductive semiconductor layers 136a, 136b, and 136c and the active layers 134a, 134b, and 134c are removed from the etched portions 120a, 120b, and 120c of the first, second, and third LED display panels 1100, 1200, and 1300 where none of the micro-LEDs 130a, 130b, and 130c are formed, and as a result, the first conductive semiconductor layers 132a, 132b, and 132c are exposed in the etched portions, respectively. The LED display panels 1100, 1200, and 1300 include first conductive metal layers 140a, 140b, and 140c formed over the portions 120a, 120b, and 120c of the first conductive semiconductor layers 132a, 132b, and 132c where none of the micro-LEDs 130a, 130b, and 130c are formed, respectively. The first conductive metal layers 140a, 140b, and 140c are spaced apart from the micro-LEDs 130a, 130b, and 130c, respectively. The first conductive metal layers 140a, 140b, and 140c are formed with predetermined widths along the peripheries of the LED display panels 1100, 1200, and 1300 on the first conductive semiconductor layers 132a, 132b, and 132c, respectively. The first conductive metal layers 140a, 140b, and 140c have substantially the same heights as the micro-LEDs 130a, 130b, and 130c, respectively. The first conductive metal layers 140a, 140b, and 140c are electrically connected to the CMOS backplane 2000 through the bumps 340. As a result, the first conductive metal layers 140a, 140b, and 140c function as common electrodes of the micro-LEDs 130a, 130b, and 130c, respectively.

The plurality of CMOS cells 230 of the CMOS backplane 2000 serve to individually drive the micro-LEDs 130a, 130b, and 130c. The CMOS cells 230 are electrically connected to the corresponding micro-LEDs 130a, 130b, and 130c through bumps 300. The CMOS cells 230 are integrated circuits for individually driving the corresponding micro-LEDs 130a, 130b, and 130c. The CMOS backplane 2000 may be, for example, an active matrix (AM) panel. Specifically, each of the CMOS cells 230 may be a pixel driving circuit including two transistors and one capacitor. When the first, second, and third LED display panels 1100, 1200, and 1300 are flip-chip bonded to the CMOS backplane 2000 through the bumps, each of the micro-LEDs may be arranged between a drain terminal and a common ground terminal of a transistor of the pixel driving circuit to form an equivalent circuit.

The CMOS backplane 2000 includes common cells 240 formed at positions corresponding to the first conductive metal layers 140a, 140b, and 140c. The first conductive metal layers 140a, 140b, and 140c are electrically connected to the common cells 240 through the common bumps 340.

As illustrated in FIG. 18, the CMOS backplane 2000 on which the CMOS cells 230 are arranged faces the first, second, and third LED display panels 1100, 1200, and 1300. After the CMOS cells 230 are brought into contact with the micro-LEDs 130a, 130b, and 130c in a one-to-one relationship, the bumps 300 and the common bumps 340 are melted by heating. As a result, the CMOS cells 230 are electrically connected to the corresponding micro-LEDs 130a, 130b, and 130c.

Although the head-mounted display apparatuses employing micromirrors according to the present invention have been described herein with reference to their embodiments, this description is not intended to fully encompass all embodiments, variations, or adaptations of the examples and/or equivalents of the invention described herein. Therefore, it will be apparent to those skilled in the art that the scope of the present invention is not limited to the embodiments described herein and is defined by the claims that follows.

What is claimed is:

1. A head-mounted display apparatus comprising:
an optical member having a front surface, a rear surface, and a plurality of side surfaces;
a display unit adapted to emit a display image toward one of the side surfaces of the optical member; and
a reflective structure disposed inside the optical member to reflect the display image emitted from the display unit and to allow the reflected display image to pass and propagate through the rear surface,
wherein the reflective structure comprises a micromirror arranged obliquely relative to a reference plane as a virtual plane extending from the front surface of the optical member to cover the reflective structure, and
wherein a width of an orthographic projection of the micromirror and a height of the micromirror are determined depending on an angle of incidence of the display image on the micromirror, an angle of reflection of the display image from the micromirror, and a refractive index of the optical member.

2. The head-mounted display apparatus according to claim 1, wherein the display image comprises: incident light between the display unit and the one of the side surfaces of the optical member, refracted light propagating through the optical member as a medium after being refracted by the one of the side surfaces of the optical member, and output light exiting from the rear surface of the optical member after being reflected by the reflective structure.

3. The head-mounted display apparatus according to claim 1, wherein the optical member includes a silicone material.

4. The head-mounted display apparatus according to claim 1, further comprising a glass part to which the optical member is attached and a frame to which the glass part is fixed.

5. The head-mounted display apparatus according to claim 4, wherein the display unit is mounted on the frame.

6. The head-mounted display apparatus according to claim 1, wherein the display unit comprises:
a first light emitting diode (LED) display panel comprising a plurality of two-dimensionally arrayed first micro-LEDs to emit a first wavelength display image,
a second LED display panel comprising a plurality of two-dimensionally arrayed second micro-LEDs to emit a second wavelength display image, and a third LED display panel comprising a plurality of two-dimensionally arrayed third micro-LEDs to emit a third wavelength display image.

7. The head-mounted display apparatus according to claim 6, wherein the display unit further comprises:
a single complementary metal oxide semiconductor (CMOS) backplane coupled to the first LED display panel, the second LED display panel, and the third LED display panel, the single CMOS backplane comprising a plurality of CMOS cells corresponding to the first micro-LEDs, the second micro-LEDs, and the third micro-LEDs to individually drive the micro-LEDs in groups.

8. The head-mounted display apparatus according to claim 7, wherein the display unit further comprises bumps electrically connecting the micro-LEDs to the corresponding CMOS cells in a state in which the micro-LEDs and the CMOS cells are arranged to face each other.

9. The head-mounted display apparatus according to claim 8, wherein:
the micro-LEDs are formed by growing a first conductive semiconductor layer, an active layer, and a second conductive semiconductor layer in this order on a substrate and etching the layers;
each of the micro-LEDs has a vertical structure comprising the substrate, the first conductive semiconductor layer, the active layer, and the second conductive semiconductor layer formed in this order; and
the active layer and the second conductive semiconductor layer are removed from exposed portions of each of the first LED display panel, the second LED display panel, and the third LED display panel where none of the micro-LEDs are formed, such that the first conductive semiconductor layer is exposed.

10. The head-mounted display apparatus according to claim 9, wherein a first conductive metal layer is formed over a portion of the first conductive semiconductor layer where none of the micro-LEDs of each of the first LED display panel, the second LED display panel, and the third LED display panel are formed.

11. A head-mounted display apparatus comprising:
an optical member having a first surface and a second surface and formed with a cut-away portion having a vertical plane and an inclined plane;
a display unit adapted to emit a display image; and
a micromirror arranged on the inclined plane of the cut-away portion formed in the optical member to reflect the display image emitted from the display unit and to allow the reflected display image to pass and propagate through the first surface,
wherein a width of an orthographic projection of the micromirror, a reference plane of the orthographic projection defined as a virtual plane extending from the second surface to cover the cut-away portion, and a height of the micromirror are determined based on an angle of incidence of the display image on the micromirror, an angle of reflection of the display image from the micromirror, and a refractive index of the optical member.

12. The head-mounted display apparatus according to claim 11, wherein the display image comprises: incident light between the display unit and the one of the side surfaces of the optical member, refracted light propagating through the optical member as a medium after being refracted by the one of the side surfaces of the optical member, and output light exiting from the rear surface of the optical member after being reflected by the reflective structure.

13. The head-mounted display apparatus according to claim 11, wherein the optical member comprises a silicone material.

14. The head-mounted display apparatus according to claim 11, further comprising a glass part to which the optical member is attached and a frame to which the glass part is fixed.

15. The head-mounted display apparatus according to claim 11, wherein the display unit comprises:
a first light emitting diode (LED) display panel comprising a plurality of two-dimensionally arrayed first micro-LEDs to emit a first wavelength display image;
a second LED display panel comprising a plurality of two-dimensionally arrayed second micro-LEDs to emit a second wavelength display image; and
a third LED display panel comprising a plurality of two-dimensionally arrayed third micro-LEDs to emit a third wavelength display image.

16. A head-mounted display apparatus comprising:
an optical member having a front surface, a rear surface, and a plurality of side surfaces;
a display unit adapted to emit a display image toward one of the side surfaces of the optical member; and
a reflective structure disposed inside the optical member to reflect the display image emitted from the display unit and to allow the reflected display image to pass and propagate through the rear surface,
wherein the display unit comprises:
a first light emitting diode (LED) display panel comprising a plurality of two-dimensionally arrayed first micro-LEDs to emit a first wavelength display image,
a second LED display panel comprising a plurality of two-dimensionally arrayed second micro-LEDs to emit a second wavelength display image, and
a third LED display panel comprising a plurality of two-dimensionally arrayed third micro-LEDs to emit a third wavelength display image.

17. The head-mounted display apparatus according to claim 16, wherein the display image comprises: incident light between the display unit and the one of the side surfaces of the optical member, refracted light propagating through the optical member as a medium after being refracted by the one of the side surfaces of the optical member, and output light exiting from the rear surface of the optical member after being reflected by the reflective structure.

18. The head-mounted display apparatus according to claim 16, wherein the optical member comprises a silicone material.

19. The head-mounted display apparatus according to claim 16, further comprising a glass part to which the optical member is attached and a frame to which the glass part is fixed.

* * * * *